United States Patent [19]
Hill et al.

[11] Patent Number: 6,131,015
[45] Date of Patent: *Oct. 10, 2000

[54] TWO-WAY COMMUNICATION SYSTEM FOR PERFORMING DYNAMIC CHANNEL CONTROL

[75] Inventors: Thomas Casey Hill, Wellington; Thomas V. D'Amico, Boca Raton, both of Fla.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/617,703

[22] Filed: Apr. 1, 1996

Related U.S. Application Data

[63] Continuation-in-part of application No. 08/493,041, Jun. 21, 1995, Pat. No. 5,606,729.

[51] Int. Cl.[7] .................................. H04B 7/26; H04Q 7/20
[52] U.S. Cl. .............................. 455/69; 455/447; 455/63; 455/67.3; 455/522
[58] Field of Search .................................. 455/33.1, 54.1, 455/54.2, 62, 63, 67.1, 67.3, 69, 522, 31.3, 426, 458, 447; 340/825.44, 311.1

[56] References Cited

U.S. PATENT DOCUMENTS

| | | | |
|---|---|---|---|
| 4,777,653 | 10/1988 | Bonnerot et al. | 455/69 |
| 4,825,193 | 4/1989 | Siwiak et al. | 340/311.1 |
| 4,875,038 | 10/1989 | Siwiak et al. . | |
| 5,038,399 | 8/1991 | Bruckert | 455/54.1 |
| 5,168,493 | 12/1992 | Nelson et al. . | |
| 5,313,652 | 5/1994 | Rozenstrauch et al. | 455/17 |
| 5,574,983 | 11/1996 | Douzono et al. | 455/522 |
| 5,594,946 | 1/1997 | Menich et al. | 455/63 |
| 5,678,187 | 10/1997 | Meidan et al. | 455/62 |
| 5,801,639 | 9/1998 | Dorenbosch et al. | 455/67.3 |

FOREIGN PATENT DOCUMENTS

| | | | |
|---|---|---|---|
| 2-192330 | 7/1990 | Japan | 455/63 |
| 3-267824 | 11/1991 | Japan | 455/67.3 |

*Primary Examiner*—Nguyen Vo
*Attorney, Agent, or Firm*—Charles W. Bethards

[57] ABSTRACT

A two-way communication system is used for performing dynamic channel control. The two-way communication system comprises a base transceiver (102) and a plurality of selective call transceivers (122). The base transceiver (102) includes a plurality of base stations (116) controlled by a controller (112). The base transceiver (102) transmits query signals to the selective call transceivers (122) to prompt communication. The selective call transceivers (122) measure the signal quality of signals transmitted by the two-way communication system and transmit in return signal quality measurement data to the base transceiver (102) for analysis. The base transceiver (102) dynamically adjusts the signal quality of signals to be received by the selective call transceivers (122) in order to substantially reduce the noise interference that the selective call transceivers (122) experience.

4 Claims, 8 Drawing Sheets

TWO-WAY COMMUNICATION SYSTEM FOR PERFORMING DYNAMIC CHANNEL CONTROL

PRIOR APPLICATION

This application is a continuation-in-part of Ser. No. 08/493,041, now U.S. Pat. No. 5,606,729 filed Jun. 21, 1995 and granted Feb. 25, 1997 by D'Amico et al., entitled "Method and Apparatus for Implementing a Received Signal Quality Measurement in a Radio Communication System."

FIELD OF THE INVENTION

This invention relates in general to two-way communication systems, and in particular to two-way communication systems performing dynamic channel control.

BACKGROUND OF THE INVENTION

Current two-way non-real-time communication systems utilize two-way messaging between a base transceiver and a plurality of selective call transceivers. When selective call transceivers experience communication problems due to noise interference, the base transceiver continues to attempt communication with the troubled selective call transceivers until a predetermined number of retries is exhausted.

Noise interference found in communication systems include co-channel interference, adjacent channel interference, and inherent noise in the receiver circuits of the selective call transceivers. Co-channel interference occurs from communication cells utilizing the same communication frequency. Adjacent channel interference is caused by power that is coupled between adjacent frequency channels.

In severe cases, selective call transceivers within the two-way communication system that experience noise interference cannot receive messages until the interference subsides, or the users of the selective call transceivers move to another location where the interference is less substantial. This situation usually results in message latencies that are inconsistent with customer expectations.

Thus, what is needed is a two-way communication system that dynamically adjusts signal quality of signals received by selective call transceivers experiencing noise interference. In particular, it is desirable that the noise interference be measured in such a manner that maintains system capacity as high as possible, while at the same time improving communication with selective call transceivers experiencing noise interference.

DESCRIPTION OF THE PREFERRED EMBODIMENT

Figure 1:
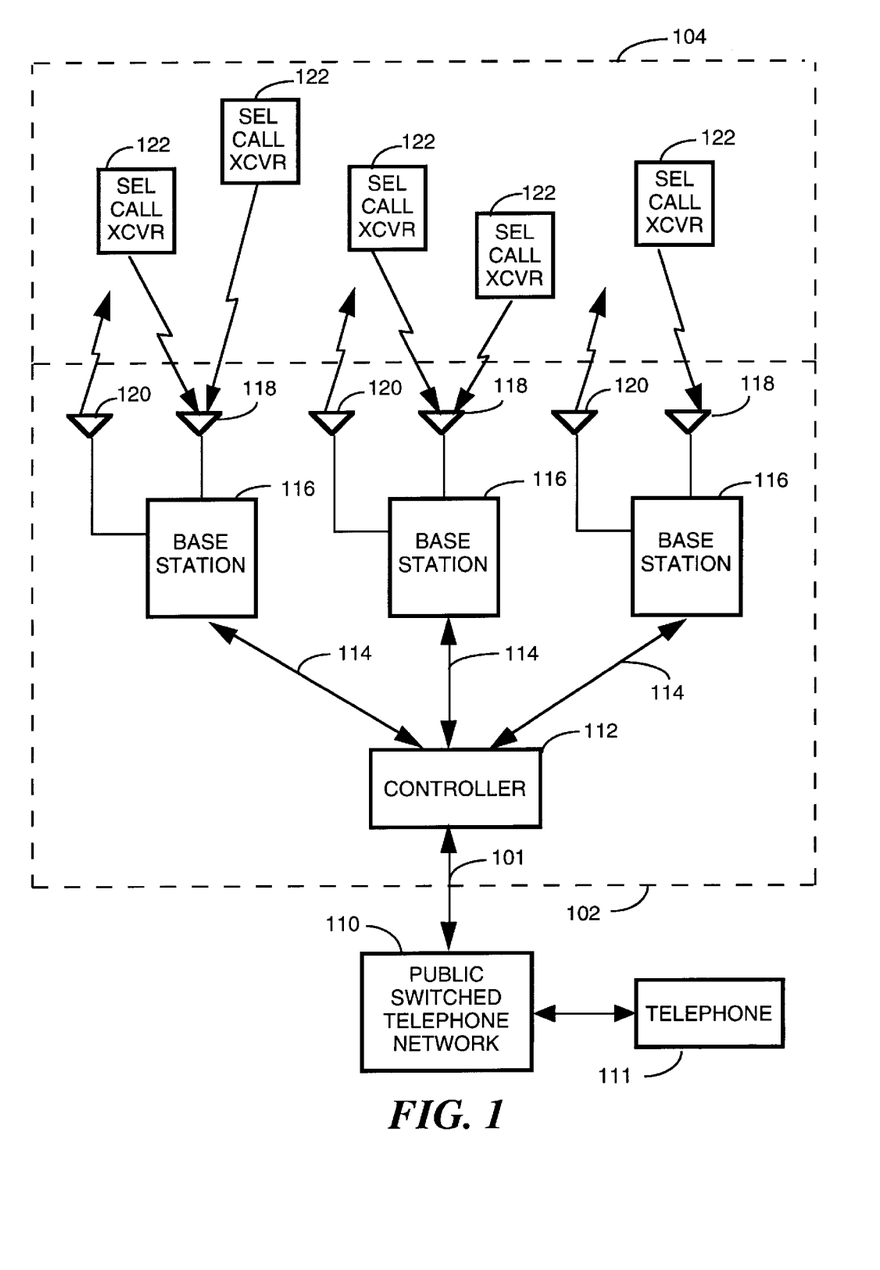
FIG. 1 is an electrical block diagram of a two-way communication system according to the present invention.

FIG. 1 is an electrical block diagram of a communication system according to the present invention. The two-way communication system comprises a base transceiver 102 and a portable portion 104. The base transceiver 102 includes a plurality of base stations 116, for communicating with the portable portion 104, utilizing conventional radio frequency (RF) techniques well known in the art, and coupled by communication links 114 to a controller 112 which controls the base stations 116. As will be explained in more detail in connection with FIG. 4, a base transceiver 102 includes a plurality of base transmitters centrally controlled by the controller 112. According to the present invention, signal quality adjustment of signals to be received by subscriber units (also called "selective call transceivers" herein) is made by the controller with respect to one or more base transmitters that either communicate with the subscriber unit or that affect the signal quality of signals received by the subscriber unit (for example co-channel interferers).

The hardware of the controller 112 is a combination of the Wireless Messaging Gateway (WMG™) Administrator! paging terminal, and the RF-Conductor!™ message distributor manufactured by Motorola, Inc. The hardware of the base stations 116 is a combination of the Nucleus® Orchestra! transmitter and RF-Audience!™ receivers manufactured by Motorola, Inc. It will be appreciated that other similar hardware can be utilized for the controller 112 and the base stations 116.

Each of the base stations 116 transmits RF signals to the portable portion 104 comprising a plurality of selective call transceivers 122 via a transmitting antenna 120. The base stations 116 each receive RF signals from the plurality of selective call transceivers 122 via a receiving antenna 118. The RF signals transmitted by the base stations 116 to the selective call transceivers 122 (outbound messages) comprise selective call addresses identifying the selective call transceiver 122, and data or voice messages originated by a caller. The RF signals transmitted by the selective call transceivers 122 to the base stations 116 (inbound messages) comprise positive acknowledgments (ACKs) which indicate the message was received reliably by the selective call transceiver 122, or negative acknowledgments (NAKs) which indicate the selective call transceiver 122 did not receive the message reliably.

A detailed description of inbound acknowledge-back messaging is more fully described in U.S. Pat. No. 4,875,038 issued Oct. 17, 1989 to Siwiak et al., which is hereby incorporated herein by reference.

The controller 112 is coupled by telephone links 101 to a public switched telephone network (PSTN) 110 for receiving selective call originations therefrom. Selective call originations comprising voice and data messages from the PSTN 110 can be generated, for example, from a conventional telephone 111 coupled to the PSTN 110 in a manner that is well known in the art.

Voice messages transmitted by the base stations 116 utilize mixed signaling techniques. A voice message includes a digital message portion and an analog message portion. The digital message portion includes at least the addressing information which is used to identify the selective call transceiver 122, and a message vector identifying the location of the analog message.

The outbound and inbound messages are, for example, similar to Motorola's well-known InFLEXion™ digital selective call signaling protocol. This protocol utilizes well-known error detection and error correction techniques and is therefore tolerant to bit errors occurring during transmission, provided that the bit errors are not too numerous in any one code word.

Outbound channel transmissions of the digital message portion transmitted by the base stations 116 utilize two and four-level frequency shift keyed (FSK) modulation, operating at sixteen hundred or thirty two hundred symbols-per-second (sps), depending on traffic requirements and system transmission gain. Outbound channel transmissions of the analog message portion transmitted by the base stations 116 utilize single side band (SSB) transmission. A voice message comprises an upper side band (USB), a lower side band (LSB) and a pilot carrier. It will be appreciated that, alternatively, a voice message can comprise the pilot carrier and a single one of the sidebands. A detailed explanation of the preferred analog voice messaging system can be found in application Ser. No. 08/395,747 filed Feb. 28, 1995 by Leitch et al., which is hereby incorporated herein by reference.

Inbound channel transmissions from the selective call transceivers 122 to the base stations 116 utilize four-level FSK modulation at a rate of eight hundred bits per second (bps). Inbound channel transmissions occur during predetermined data packet time slots synchronized with the outbound channel transmissions. The outbound and inbound channels operate on separate carrier frequencies utilizing frequency division multiplex (FDM) techniques well known in the art. A detailed description of FDM techniques is more fully described in U.S. Pat. No. 4,875,038 issued to Siwiak et al. It will be appreciated that, alternatively, the outbound and inbound channels can operate on a single carrier frequency using time division duplex (TDD) techniques as described more fully in U.S. Pat. No. 5,168,493 issued to Nelson et al. It will be further appreciated that, alternatively, other signaling protocols, modulation schemes, and transmission rates can be utilized for either or both transmission directions.

Figure 2:
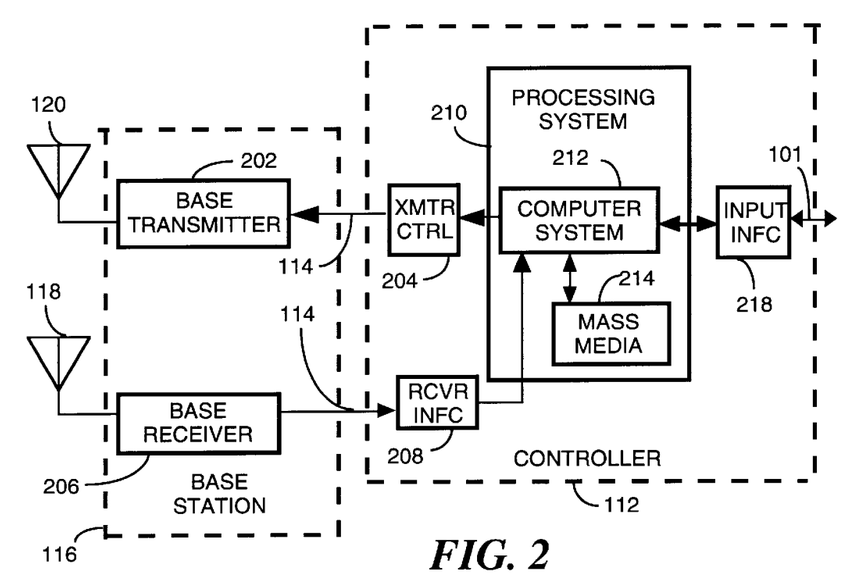
FIG. 2 is an electrical block diagram of elements of a fixed portion of the two-way communication system according to the present invention.

FIG. 2 is an electrical block diagram of elements of the base transceiver 102 according to the present invention. The base transceiver 102 comprises portions of the controller 112 and the base stations 116. The controller 112 comprises a processing system 210 for directing operation of the controller 112. The processing system 210 is coupled through a transmitter controller 204 to a base transmitter 202 via the communication links 114. The communication links 114 use conventional means well known in the art, such as a direct wire line (telephone) link, a data communication link, or any number of radio frequency links, such as a radio frequency (RF) transceiver link, a microwave transceiver link, or a satellite link, just to mention a few.

The base transmitter 202 transmits two and four-level FSK data messages to the selective call transceivers 122 during a digital message portion. A lower sideband (LSB), upper sideband (USB) and a pilot are transmitted by the base transmitter during the analog message portion for voice messages. The processing system 210 is also coupled to at least one base receiver 206 through a receiver interface 208 via the communication links 114. The base receiver 206 demodulates four-level FSK and is collocated with the base stations 116, as implied in FIG. 2, but can be positioned remote from the base stations 116 to avoid interference from the base transmitter 202. The base receiver 206 is for receiving one or more acknowledgments (ACKs or NAKs) from the selective call transceivers 122.

The processing system 210 is also coupled to an input interface 218 for communicating with the PSTN 110 through the telephone links 101 for receiving selective call originations. In order to perform the functions (to be described below) necessary in controlling the elements of the controller 112, as well as the elements of the base stations 116, the processing system 210 includes a conventional computer system 212, and conventional mass storage media 214. The conventional mass storage media 214 includes, for example, subscriber user information such as, addresses for selective call transceivers 122, programming options, and signal quality measurements received from the selective call transceivers 122 as will be described below. The conventional computer system 212 is programmed by way of software included in the conventional mass storage media 214.

The conventional computer system 212 comprises a plurality of processors such as, for example, VME Sparc™ processors manufactured by Sun Microsystems, Inc. These processors include memory such as dynamic random access memory (DRAM), which serves as a temporary memory storage device for scratch pad processing such as, for example, storing messages originated by callers using the PSTN 110, processing acknowledgments received from the selective call transceivers 122, and for protocol processing of messages destined for the selective call transceivers 122, just to mention a few. The conventional mass storage media 214 is a conventional hard disk mass storage device.

It will be appreciated that other types of conventional computer systems 212 can be utilized, and that additional computer systems 212 and mass storage media 214 of the same or alternative type can be added as required to handle the processing requirements of the processing system 210.

Figure 3:
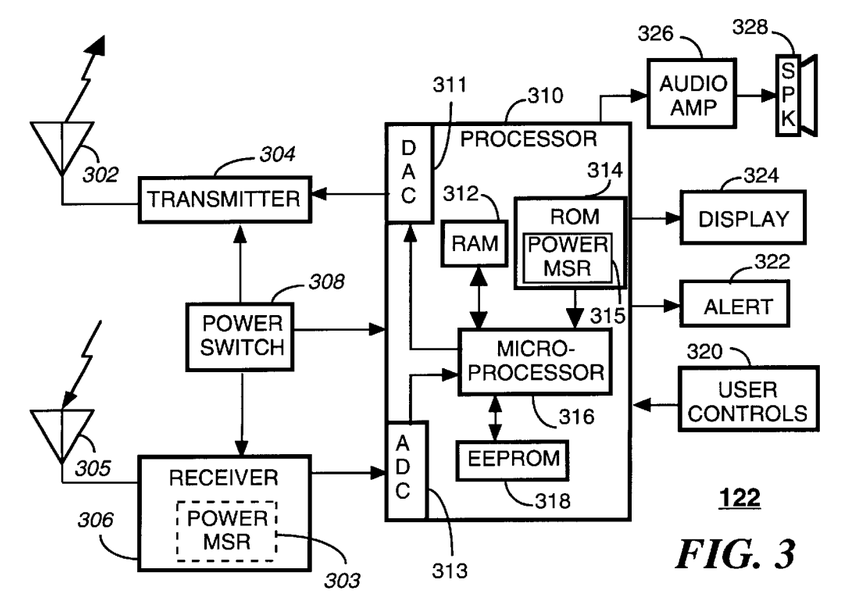
FIG. 3 is an electrical block diagram of a selective call transceiver according to the present invention.

FIG. 3 is an electrical block diagram of the selective call transceiver 122 according to the present invention. The selective call transceiver 122 comprises a transmitter antenna 302 for transmitting RF signals to the base stations 116 and a receiver antenna 305 for intercepting RF signals from the base stations 116. The transmitter antenna 302 is coupled to a transmitter 304 that utilizes conventional techniques well known in the art. Similarly, the receiver antenna 305 is coupled to a receiver 306 for receiving RF signals from the base stations 116. The RF signals received from the base stations 116 use conventional two and four-level FSK. The RF signals transmitted by the selective call transceiver 122 to the base stations 116 use four-level FSK.

Radio signals received by the receiver 306 produce demodulated information at the output. The demodulated information is coupled to the input of a processor 310, which processes outbound messages. Similarly, inbound acknowledgment messages are processed by the processor 310 and delivered to the transmitter 304 for transmission. A conventional power switch 308, coupled to the processor 310, is used to control the supply of power to the transmitter 304 and the receiver 306, thereby providing a battery saving function.

To perform the necessary functions of the selective call transceiver 122, the processor 310 includes a microprocessor 316, a RAM 312, a ROM 314, an EEPROM 318, and a digital to analog converter (DAC) 311, and an analog to digital converter (ADC) 313. The RAM 312, the ROM 314, and the EEPROM 318 comprise the elements of a memory of the processor 310. The microprocessor 316 is similar to the DSP56100 digital signal processor (DSP) manufactured by Motorola, Inc. It will be appreciated that other similar processors can be utilized for the microprocessor 316, and that additional processors of the same or alternate type can be added as required to handle the processing requirements of the processor 310. It will be appreciated that other types of memory, e.g., EEPROM or FLASH, can be utilized for the ROM 314, as well as the RAM 312. It will be further appreciated that the RAM 312 and the ROM 314, singly or in combination, can be integrated as a contiguous portion of the microprocessor 316.

The microprocessor 316 is programmed by way of the ROM 314 to process received outbound messages, and in response thereto for creating and formatting inbound messages. During outbound message processing, the microprocessor 316 samples the demodulated signal generated by the receiver 306 by way of the ADC 313. The microprocessor 316 then decodes an address in the demodulated data of the outbound message, compares the decoded address with one or more addresses stored in the EEPROM 318, and when a match is detected, the microprocessor 316 proceeds to perform a signal quality measurement on the signals of the outbound message transmitted by the base transmitter 202.

A preferred method for performing signal quality measurements is disclosed in co-pending and commonly assigned U.S. application Ser. No. 08/493,041 filed Jun. 21, 1995 by D'Amico et al., entitled "Method and Apparatus for Implementing a Received Signal Quality Measurement in Radio Communication System," which is incorporated herein by reference. A description of relevant portions of this method is provided herein.

Specifically, the ROM 314 includes a power measurement element 315 which instructs the microprocessor 316 in the procedure for performing signal quality measurements during message processing. It will be appreciated that, alternatively, a hardware power measurement element 303 included in the receiver 306 can be used to replace the software implemented power measurement element 315. The hardware power measurement element 303 is one or more received signal strength indicators (RSSI) functionally similar to, for example, the MC13135 RSSI device manufactured by Motorola, Inc. Note each RSSI device measures the mean RMS signal power for the pilot carrier and USB or LSB signals.

Once the signal quality measurement has been determined, the selective call transceiver 122 proceeds to send a NAK response message to the base stations 116 along with the signal quality measurement data if the quality of signals measured by the selective call transceiver 122 are below a predetermined minimum quality threshold. For signal quality measurements above the minimum quality threshold, the selective call transceiver 122 sends an ACK to the base stations 116. In an alternative embodiment, the ACK message is accompanied with the signal quality measurement data. Subsequently, the selective call transceiver 122 processes the outbound message sent by the base station 116.

In yet another alternative embodiment, the selective call transceiver 122 can transmit signal quality measurement data during any inbound message transaction. This transaction could be, for example, an unscheduled inbound message transaction initiated by the selective call transceiver 122 in response to a communication request by the user of the selective call transceiver 122 with the base transceiver 102.

Once the microprocessor 316 has processed the message, it stores the message in the RAM 312, and a call alerting signal is generated to alert a user that a message has been received. The call alerting signal is directed to a conventional audible or tactile alerting device 322 for generating an audible or tactile call alerting signal. In addition, the microprocessor 316 is programmed to send the ACK or NAK depending on the quality of the received message. To send the acknowledgment, the microprocessor 316 utilizes the DAC 311 to modulate the transmitter with the FSK data corresponding to the acknowledgment messages.

The message can be accessed by the user through user controls 320, which provide functions such as lock, unlock, delete, read, etc. More specifically, by the use of appropriate functions provided by the user controls 320, the message is recovered from the RAM 312, and then displayed on a display 324, e.g., a conventional liquid crystal display (LCD), or played out audibly, in the case of a voice message, by the combination of an audio amplifier 326 and a speaker 328.

Figure 4:
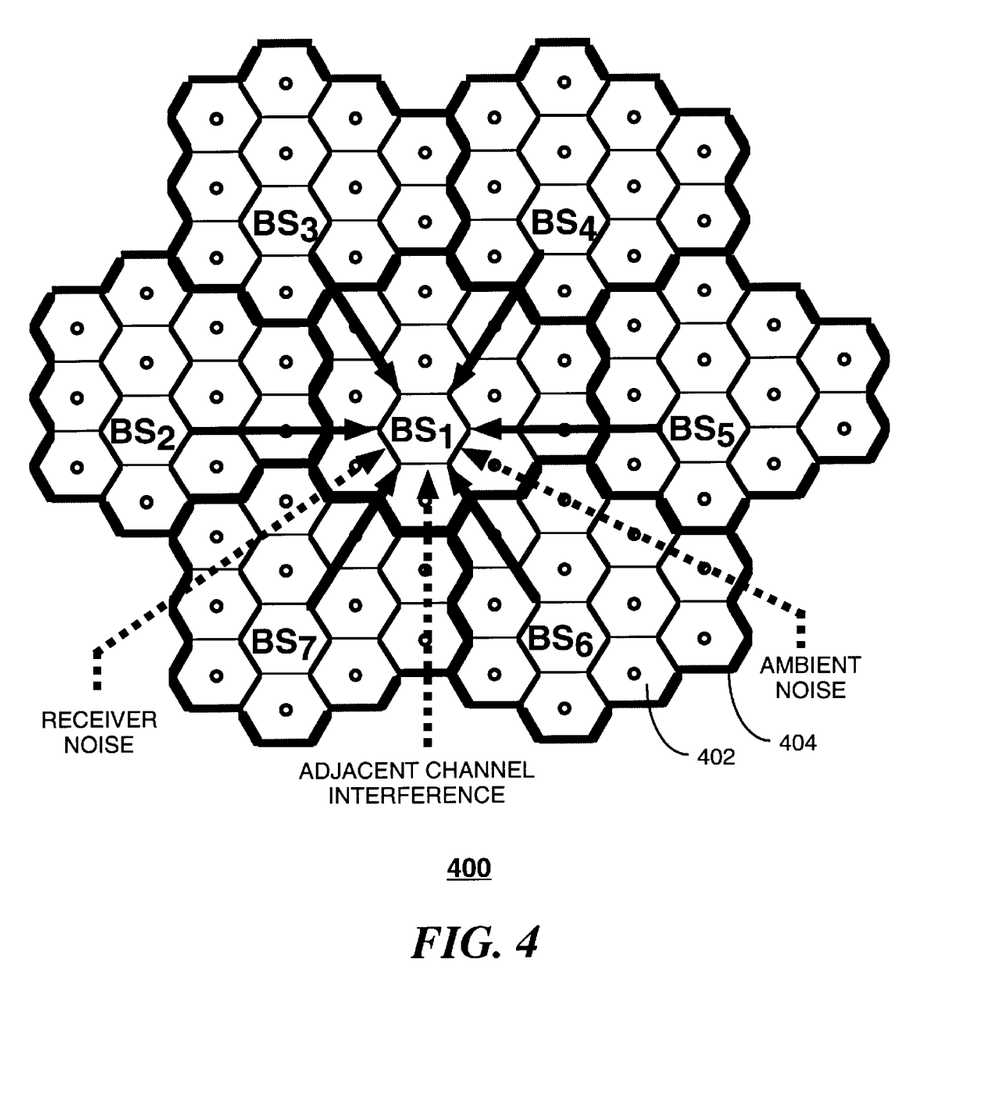
FIG. 4 is a coverage diagram of the two-way communication system comprising a plurality of coverage zones grouped in coverage zone clusters according to the present invention.

FIG. 4 is a coverage diagram of the two-way communication system comprising a plurality of coverage zones 402 grouped in coverage zone clusters 404 according to the present invention. The coverage zone clusters 404 comprise twelve coverage zones 402. It will be appreciated that, alternatively, more or less coverage zones 402 can be used in the coverage zone clusters 404. Each coverage zone 402 within the coverage zone cluster 404 includes a base station 116 (e.g., $BS_1$). In this example, base station 116 $BS_1$ within the coverage zone 402 has a corresponding set of base stations 116 $BS_2$, $BS_3$, $BS_4$, $BS_5$, $BS_6$, and $BS_7$ within coverage zones 402 of different coverage zone clusters 404 which transmit messages utilizing the same subchannel frequency.

Thus, base stations 116 $BS_2$, $BS_3$, $BS_4$, $BS_5$, $BS_6$, and $BS_7$ are first tier co-channel interferers of BS1 The co-channel interference is shown with solid arrows pointed into $BS_1$ from each of the base stations 116 $BS_2$, $BS_3$, $BS_4$, $BS_5$, $BS_6$, and $BS_7$. In addition to co-channel interference, transmissions from $BS_1$ also suffer from adjacent channel interference (shown with a dashed arrow) from base stations 116 in other coverage zones 402 which utilize adjacent subchannel frequencies. Additionally, ambient noise (shown with a dashed arrow) such as, for example, Gaussian white noise spread throughout the two-way communication system also contributes to the degradation of signals transmitted by $BS_1$. From the point of view of a selective call transceiver 122 located within the coverage zone 402 of $BS_1$, transmitted signals from $BS_1$ are further degraded by the inherent noise of the receiver 306. It is expected that co-channel interference is the most significant contributor to the degradation of signals transmitted by $BS_1$.

Figure 5:
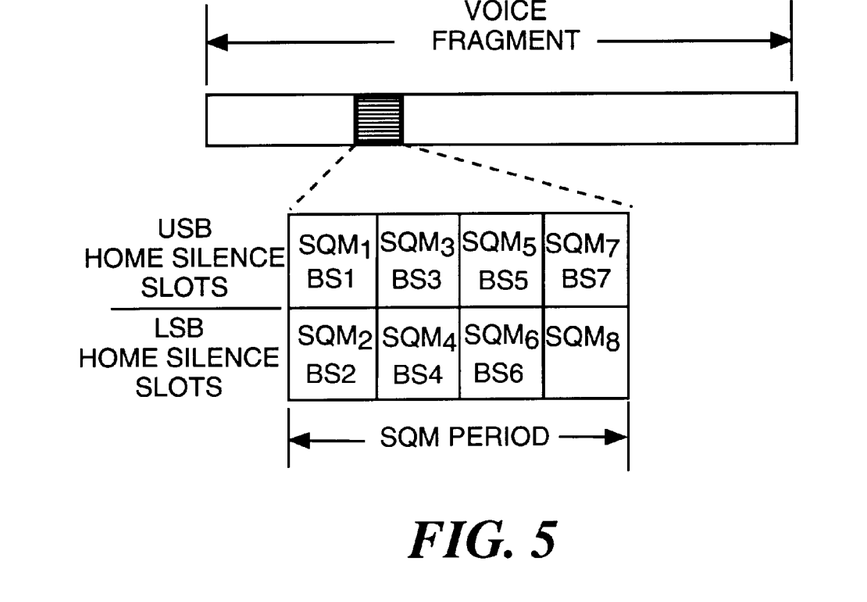
FIGS. 5 and 6 are first and second embodiments of a timing diagram of a plurality of predetermined synchronized signal quality measurement slots transmitted with the analog voice message according to the present invention.

Normally in mixed signaling systems utilizing digital and analog transmission of voice messages, distortion in the transmitted message can be detected in the digital message portion with error detection or correction codes well known in the art. For the analog message portion, however, distortion in the transmitted message cannot readily be detected without some form of a signal quality measurement. FIG. 5 is a timing diagram of a first embodiment of a plurality of predetermined synchronized signal quality measurement (SQM) slots transmitted with an analog voice message in accordance with the present invention.

An analog voice message comprises one or more voice fragments.

Within each voice fragment an SQM period is reserved for measurements that assist in predicting the signal quality of a received analog voice message. The SQM period comprises SQM slots (SQM$_1$ through SQM$_8$ shown by way of example). The SQM slots are transmitted proximate the voice fragment, e.g., before or after the voice fragment and within the same protocol frame as the voice fragment. It will be appreciated that the SQM slots can be transmitted in other positions as well, such as within the voice fragment.

The SQM period is 30 ms in duration, and the SQM slots are 7.5 ms in duration. It will be appreciated that, alternatively, the SQM period and SQM slot duration can be of greater or lesser length than specified depending on the application. Each SQM slot represents analog transmission of an USB, or a LSB and an associated pilot carrier. In addition, each base station 116 is assigned to a side band corresponding to each SQM slot (BS$_1$, through BS$_7$ shown by way of example). The SQM slot assigned to each base station 116 is defined as a home silence slot. Base stations 116 BS$_1$, BS$_3$, BS$_5$, and BS$_7$ are assigned to the USB silence slots while base stations 116 BS$_2$, BS$_4$, and BS$_6$ are assigned to the LSB silence slots. In this example, there is no base station 116 represented by SQM$_8$, thus all base stations 116 transmit a tone in SQM$_8$, as described further below.

In the first embodiment of the present invention, the base stations 116 transmit a tone (e.g., 1 KHz) in all SQM slots excluding their home silence slot. In this embodiment only SQM slots 1 through 8 are utilized. In this method, a selective call transceiver 122 in the coverage zone 402 of BS$_1$ in the SQM slot assigned to BS$_1$ receives a tone signal from BS2 through BS$_8$. Similarly, in the silence slot assigned to BS$_2$ the selective call transceiver 122 receives a tone signal from BS$_1$, BS$_3$, BS$_4$, BS$_5$, BS$_6$, and BS$_7$, and so on. Transmitting tones in this manner provides a selective call transceiver 122 located in the coverage zone 402 of BS$_1$ a method for measuring the co-channel interference from first tier co-channel interferers (i.e., BS$_2$ through BS$_7$), as well as co-channel interference from higher tiers.

This method is applied throughout the two-way communication system for all coverage zones 402 and coverage zone clusters 404 simultaneously prior to the transmission of an analog voice message. However, base stations 116 which do not intend to transmit a voice frame remain silent for all tone slots, and thus do not contribute as co-channel interferers during the measurement process. During the simultaneous transmission of all coverage zones 402 and associated coverage zone clusters 404 in the two-way communication system, the selective call transceiver 122 within the coverage zone 402 of BS$_1$, for example, measures noise interference comprising co-channel interference and adjacent channel interference, and receiver noise. Noise interference may also be referred to as interference plus noise (I+N).

The selective call transceiver 122 is also programmed to determine the home silence slot in cases where the home silence slot location is not provided in the outbound message. In order to determine the home silence slot, the processor 310 of the selective call transceiver 122 is programmed to first measure the mean RMS pilot power P$_{mx}$ corresponding to each SQM slot (P$_{m1}$ through P$_{m4}$), and the mean RMS power of the interference plus noise (I+N) for each SQM slot (I$_{m1}$ through I$_{m8}$), all expressed in milli-watts. During the demodulation process of the LSB and USB signals, the processor 310 of the selective call transceiver 122 is programmed to divide the side band signals by the mean RMS power of the pilot, thus normalizing variations in the received signals.

However, during conditions which degrade the pilot carrier mean power (e.g., fading) dividing the side bands by the mean RMS power of the pilot signal results in an increase of the I+N intercepted by the selective call transceiver 122. For this reason, during detection of the home silence slot, the demodulated signal is multiplied by the mean pilot power of its corresponding SQM slot resulting in the products P$_{m1}$I$_{m1}$, P$_{m1}$I$_{m2}$, P$_{m2}$I$_{m3}$, P$_{m2}$I$_{m4}$, P$_{m3}$I$_{m5}$, P$_{m3}$I$_{m6}$, P$_{m4}$I$_{m7}$, and P$_{m4}$I$_{m8}$. This removes the normalization step, and results in a true comparison of the mean RMS power of the I+N for each SQM slot.

Since BS$_1$ does not transmit a tone in its home silence slot, the lowest product of P$_{mx}$I$_{mx}$ identifies the home silence slot, which for this example is P$_{m1}$I$_{m1}$ for a selective call transceiver 122 residing in the coverage zone 402 of BS$_1$. Once the home silence slot has been identified, the processor 310 of the selective call transceiver 122 is programmed to determine a signal quality threshold (T), expressed in dBm, which follows the expression T=S$_d$−(V$_m$−I$_m$)+P$_m$, where S$_d$ is a predetermined minimum desired signal to interference plus noise ratio, expressed in dB, of the signal received by the selective call transceiver 122, where V$_m$ is a predetermined normal mean RMS power of the analog voice message portion, expressed in dBm, where I$_m$ is the noise interference mean RMS power of the home silence slot (in this example, I$_{m1}$), expressed in dBm, and wherein P$_m$ is the mean RMS pilot power measured during the SQM period (in this example, P$_{m1}$) expressed in dBm. The value of S$_d$ is received over-the-air (OTA), and is considered a quality factor defined by the system provider of the two-way communication system. The value of V$_m$ is factory programmed into the selective call transceiver 122. Thus, S$_d$ and V$_m$ are constants.

The equation for T can also be expressed as:

$$T = \frac{S_d \cdot I_m \cdot P_m}{V_m},$$

where S$_d$ is a dimensionless ratio, and T, I$_m$, P$_m$, and V$_m$ are expressed in milli-watts. As discussed above, S$_d$ and V$_m$ are constants, thus the remaining variable for the above equation is I$_m$. For this reason, an increase in I$_m$ results in an increase of T, and a decrease in I$_m$ results in a decrease of T. The threshold equation for T implies that the greater the measured noise interference, the more pilot signal power is required in the received signal to compensate for the higher noise interference. In contrast, the lower the measured noise interference, the less pilot signal power is required in the received signal. Since the mean RMS pilot power is expected to track with the mean RMS power of the side bands, T provides a signal quality means to determine the quality of a received signal.

Figure 6:
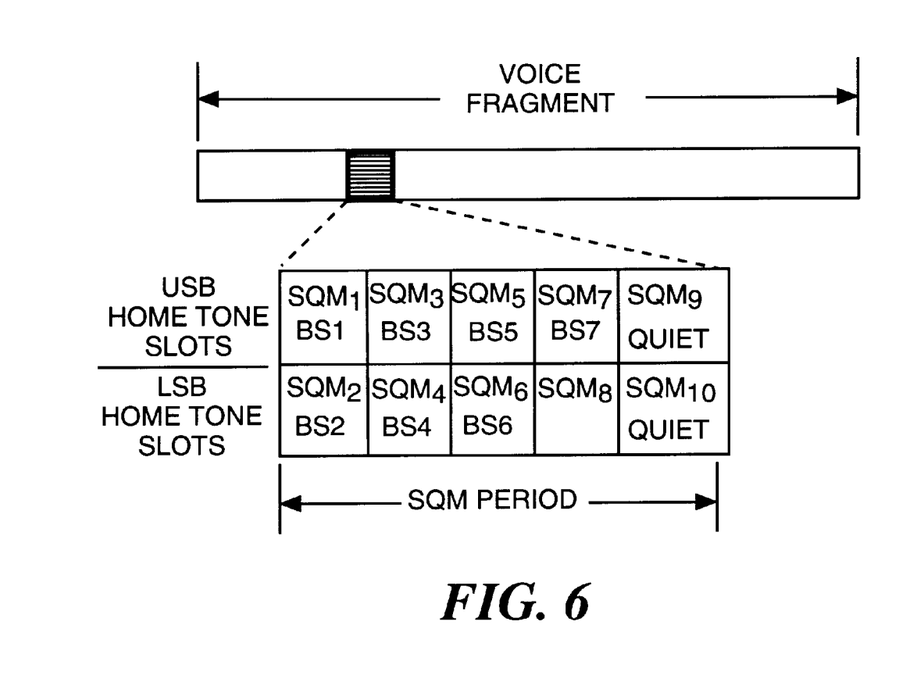

FIG. 6 is a timing diagram of a second embodiment of a plurality of predetermined synchronized signal quality measurement (SQM) slots transmitted with an analog voice message in accordance with the present invention. In the second embodiment of the present invention, the base stations 116 transmit a tone (e.g., 1 KHz) only in a home tone slot. In this arrangement, a selective call transceiver 122, unaware of the location of its home tone slot, is programmed to measure the mean RMS power of the pilot P$_{mx}$ corresponding to each SQM slot (P$_{m1}$, P$_{m2}$, P$_{m3}$, P$_{m4}$, and P$_{mq}$), and the mean RMS power of the noise interference $I_{mx}$ of each tone slot ($I_{m1}$, $I_{m2}$, $I_{m3}$, $I_{m4}$, $I_{m5}$, $I_{m6}$, $I_{m7}$, $I_{m8}$, and $I_{mq}$), all expressed in milli-watts.

As was done above, each component of $I_{mx}$ is multiplied with its corresponding $P_{mx}$ to remove the effects of the normalization step (i.e., $P_{m1}I_{m1}$, $P_{m1}I_{m2}$, $P_{m2}I_{m3}$, $P_{m2}I_{m4}$, $P_{m3}I_{m5}$, $P_{m3}I_{m6}$, $P_{m4}I_{m7}$, $P_{m4}I_{m8}$, and $P_{mq}I_{mq}$). Note, since no tones from any base stations 116 are transmitted during the quiet slots no co-channel interference is present, thus $I_{mq}$ represents primarily the noise component of I+N at the selective call transceiver 122. Since $BS_1$ transmits a tone in its home tone slot, the highest product of $P_{mx}I_{mx}$ identifies the home tone slot, which for this example is $P_{m1}I_{m1}$ for a selective call transceiver 122 residing in the coverage zone 402 of $BS_1$. Once the home tone slot has been identified, the selective call transceiver 122 is programmed to determine the total noise interference ($I_{mt}$) of its coverage zone 402 which follows the expression:

$$I_{m_t} = \sum_{x=1}^{N} \frac{I_{m_x} \times P_{m_x}}{P_{m_q}} - (N-1)I_{m_q}$$

For a selective call transceiver 122 located in the coverage zone 402 of $BS_1$, N=7 (i.e., $I_{mx}$ for $BS_2$ through $BS_8$), and $I_{m1}$ is excluded from the calculation. The term $I_{mx}*P_{mx}/P_{mq}$ moves the normalization reference from $P_{mx}$ to $P_{mq}$. Since each $I_{mx}$ includes a noise component comprising ambient noise, adjacent channel interference from other two-way communication systems, and inherent noise from the receiver 306, the summation of the $I_{mx}$ terms adds a set of unnecessary noise components (in this example, 6 additional noise terms). The term $(N-1)*I_{mq}$ removes the additional noise components since $I_{mq}$ is essentially the noise term present at the selective call transceiver 122.

Once $I_{mt}$ has been determined, the processor 310 of the selective call transceiver 122 is programmed to determine a signal quality threshold (T), expressed in dBm, which follows the expression $T=S_d-(V_m-I_{mt})+P_{mq}$, where $S_d$ is a predetermined minimum desired signal to (noise) interference, expressed in dB, of the signal received by the selective call transceiver 122, where $V_m$ is a predetermined normal mean RMS power of the analog voice message portion, expressed in dBm, where $I_{mt}$ is the determined total noise interference mean RMS power, expressed in dBm, and wherein $P_{mq}$ is the mean RMS pilot power measured during the quiet slot, expressed in dBm. The function of this equation follows the description given above for the first embodiment.

The equation for T can also be expressed as:

$$T = \frac{S_d \cdot I_m \cdot P_m}{V_m},$$

where $S_d$ is a dimensionless ratio, $I_{mt}$, $P_{mq}$, and $V_m$ are expressed in milli-watts.

The first and second embodiments discussed above, utilize methods for determining the home tone slot and quiet slot which required multiplication of the noise interference $I_{mx}$ with its corresponding pilot signal $P_{mx}$. This procedure removes the normalization introduced by the demodulator. It will be appreciated that, alternatively, this procedure can be avoided by having the demodulator not divide the signal received from the tone slots by the pilot carrier during signal quality measurements. This reading can be utilized to quicken the determination of the home tone slot and quiet slot (second embodiment only). In addition, the equations for T can be determined such that the pilot term is no longer necessary.

Figure 7:
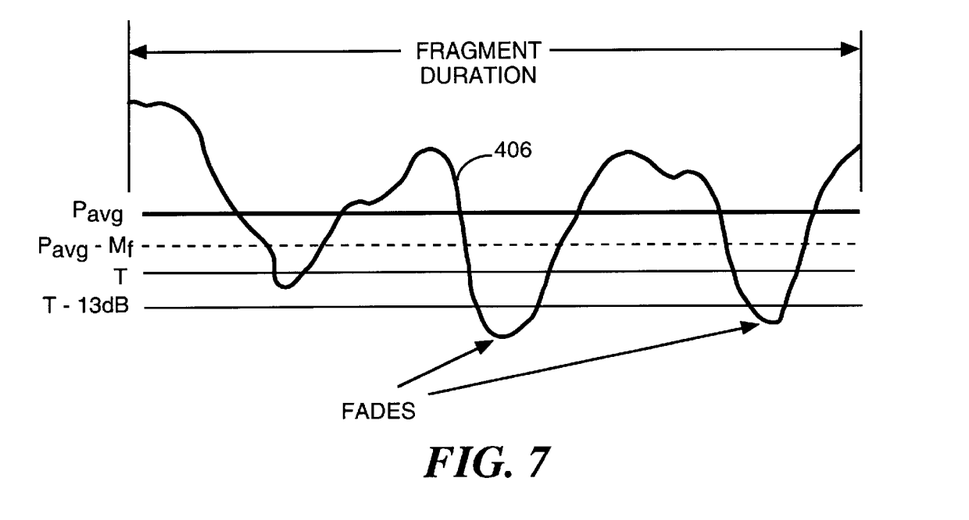
FIG. 7 is a timing diagram representing instantaneous sampling of a plurality of values of pilot carrier power during transmission of the analog voice message, and the measurement thresholds used to determine the quality of the received analog voice message according to the present invention.

FIG. 7 is a timing diagram representing instantaneous sampling of a plurality of values of pilot carrier power during reception of the analog voice message, and the measurement thresholds used to determine the quality of the received analog voice message according to the present invention. The signal 406 represents instantaneous sampling of pilot carrier power. As discussed above, T represents the signal quality threshold tested against the received signal. $P_{avg}$ represents the mean RMS power calculated over a voice fragment, expressed in dBm. To account for fading $P_{avg}$ is subtracted by a fade margin ($M_f$) which follows the expression $$M_f = \min(6, P_f[3+12/R_f]),$$

expressed in dB. This formula is empirically derived. It will be appreciated that, alternatively, another formula derived analytically and/or empirically can be used. $R_f$ represents the number of fades per second more than 13 dB below the threshold T. $P_f$ represents the percent of samples more than 13 dB below the threshold T. FIG. 7 shows two fade crossings (pointed to by arrows) resulting in a fading rate of $R_f$=(2/fragment duration), in seconds.

Only two regions of the pilot power samples fall 13 dB below the threshold T. Thus $P_f$ equals the total number of samples 13 dB below T divided by the total sample count over a fragment duration, times one hundred. The fade margin equation is limited to 6 dB, that is, $P_f[3+12/R_f]$ is capped at 6 dB.

The calculated $M_f$ is subtracted from $P_{avg}$ as shown in FIG. 7, thus bringing $P_{avg}$ closer to the threshold T (i.e., adding a stricter requirement of the quality of the receive signal). As long as $P_{avg}-M_f$ is greater than the threshold T the fragment is deemed of acceptable quality as shown by this example. Once the fragment has been processed, the selective call transceiver 122 saves the fragment in the RAM 312, and transmits an ACK to the controller 112 confirming a reliable transaction for the fragment. If $P_{avg}-M_f$ falls below the threshold T, then the selective call transceiver 122 discards the fragment, and transmits a NAK to the controller 112 negating the transaction.

Once the controller 112 receives the NAK from the selective call transceiver 122 it reconstructs the fragment and re-transmits it to the selective call transceiver 122. In the case where multiple fragments are processed by the selective call transceiver 122, some of which pass the threshold test, and others which fail the threshold test, the ACK and NAK messages include sufficient information to identify the fragments which need re-transmission and those which do not.

It will be appreciated that the selective call transceiver 122 can also be programmed to differentiate between co-channel and adjacent channel interference by comparing the measured interference of the home tone slot to the silence slot. If the levels are approximately the same and above a predetermined level, this indicates that adjacent channel interference is the major source of interference. If the home tone slot is higher, this indicates co-channel interference is the major source of interference.

The selective call transceiver 122 can further be programmed to differentiate between co-channel or adjacent channel interference and receiver noise interference by comparing the interference level to a predetermined level in the receiver 306. If the measured interference level is above this predetermined level, the major source of interference is predominately co-channel or adjacent channel interference.

Figure 8:
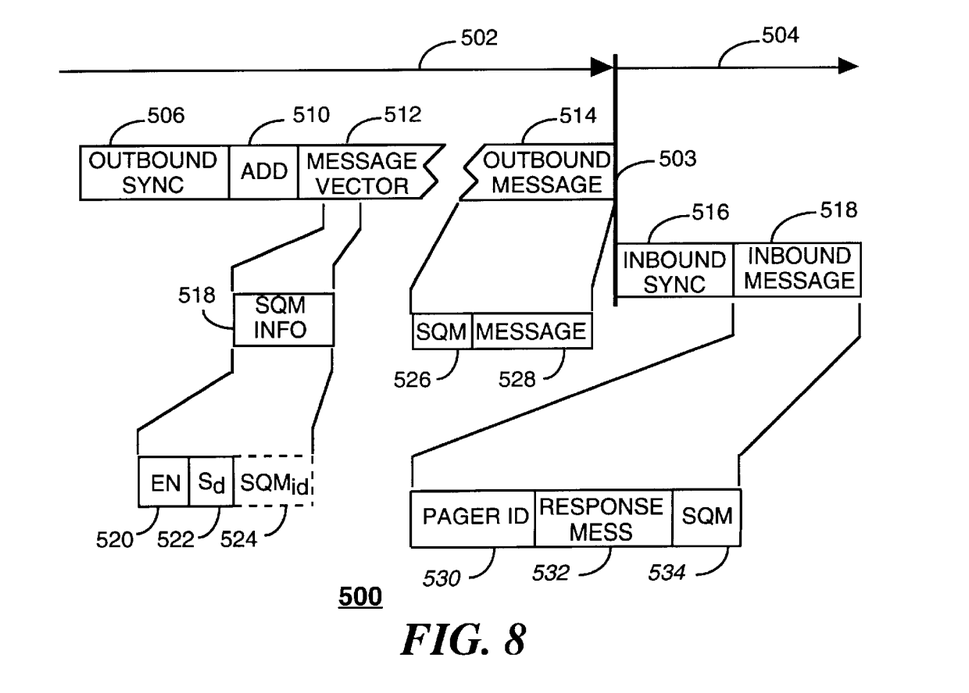
FIG. 8 is a timing diagram of elements of an outbound protocol and an inbound protocol of the fixed and portable portions of the two-way communication system according to the present invention.

FIG. 8 is a timing diagram of elements of an outbound protocol and an inbound protocol of the base transceiver 102 and portable portion 104 of the two-way communication system according to the present invention. The signaling format operating on the outbound and inbound channels operates on independent frequencies utilizing FDM as described above. Using FDM transmission the outbound RF channel transmission is depicted during an outbound transmission time interval 502, while the inbound RF channel transmission is depicted during an inbound transmission time interval 504. The outbound transmission time interval 502 and the inbound transmission time interval 504 are subdivided by a time boundary 503. The time boundary 503 depicts a point in time before which the outbound transmissions must cease and after which the inbound transmissions can commence.

The elements of the outbound protocol comprise an outbound sync 506, a selective call address 510, a message vector 512 and an outbound message 514, while the inbound protocol comprises an inbound sync 516 and an inbound message 518. The outbound sync 506 provides the selective call transceiver 122 a means for synchronization utilizing techniques well known in the art. The selective call address 510 identifies the selective call transceiver 122 for which the outbound message 514 is intended. The message vector 512 points in time within the signal format to the position of the outbound message 514 to be received by the selective call transceiver 122.

In addition, the message vector 512 includes an SQM information field 508. The SQM information field 508 comprises an enable code word 520, and a desired signal to interference plus noise constant $S_d$ 522. The enable code word 520 enables or alternatively disables the signal quality measurement performed by the corresponding selective call transceiver 122. $S_d$ 522 provides the constant needed in determination of the threshold T equation discussed above.

The system provider of the two-way communication system defines the desired dB level for $S_d$. In an alternative embodiment of the present invention, the SQM information field 508 also includes an $SQM_{id}$ 524. The $SQM_{id}$ 524 is used to identify the home silence/tone slot assigned to the coverage zone 402 in which the selective call transceiver 122 is known to be located, which precludes the need to search for the home silence/tone slot. It will be appreciated that, alternatively, the SQM information field 508 can also be located in any other appropriate portion of the outbound message stream within the outbound transmission time interval 502. Moreover, the signal to be measured and adjusted for is alternatively a digital signal transmitted using various FM or AM communication techniques. The outbound message 514 comprises an SQM period 526 and an analog voice message 528. The SQM period 526 utilized for the determination of the threshold T, as described above.

Inbound messages are transmitted during scheduled time slots. The inbound sync 516 provides the base stations 116 a means for synchronization utilizing techniques well known in the art. The inbound message 518 comprises a pager identifier (ID) 830, a response message 532, and a signal quality measurement data (SQM) 534. The pager ID 830 is, for example, the address of the selective call transceiver 122 included in the EEPROM 318. The response message 532 is either an ACK or NAK message depending on the quality of signals received from the base transceiver 102 during outbound message reception.

The SQM data 534 is the signal quality measurement data sampled by the processor 310. The signal quality measurement data 534 is transmitted to the base stations 116 with NAK messages. As an alternative, the signal quality measurement data can also be sent with ACK responses.

In an alternative embodiment, the inbound protocol allows for messages to be transmitted during unscheduled time slots. These time slots are intermixed with the scheduled time slots. The unscheduled time slots comprise the same elements as the scheduled time slots. During unscheduled inbound messaging, the selective call transceiver 122 is programmed for one of two mode.

In a first mode, the selective call transceiver 122 is programmed to transmit SQM data 534 in the unscheduled inbound message, while in a second mode the selective call transceiver 122 is programmed not to send SQM data 534. These programming modes are controlled by the base transceiver 102 by way of conventional over-the-air programming. Unscheduled and scheduled inbound transmissions including SQM data 534 are used by the base transceiver 102 for creating an SQM historical database, as will be described below.

Figure 9:
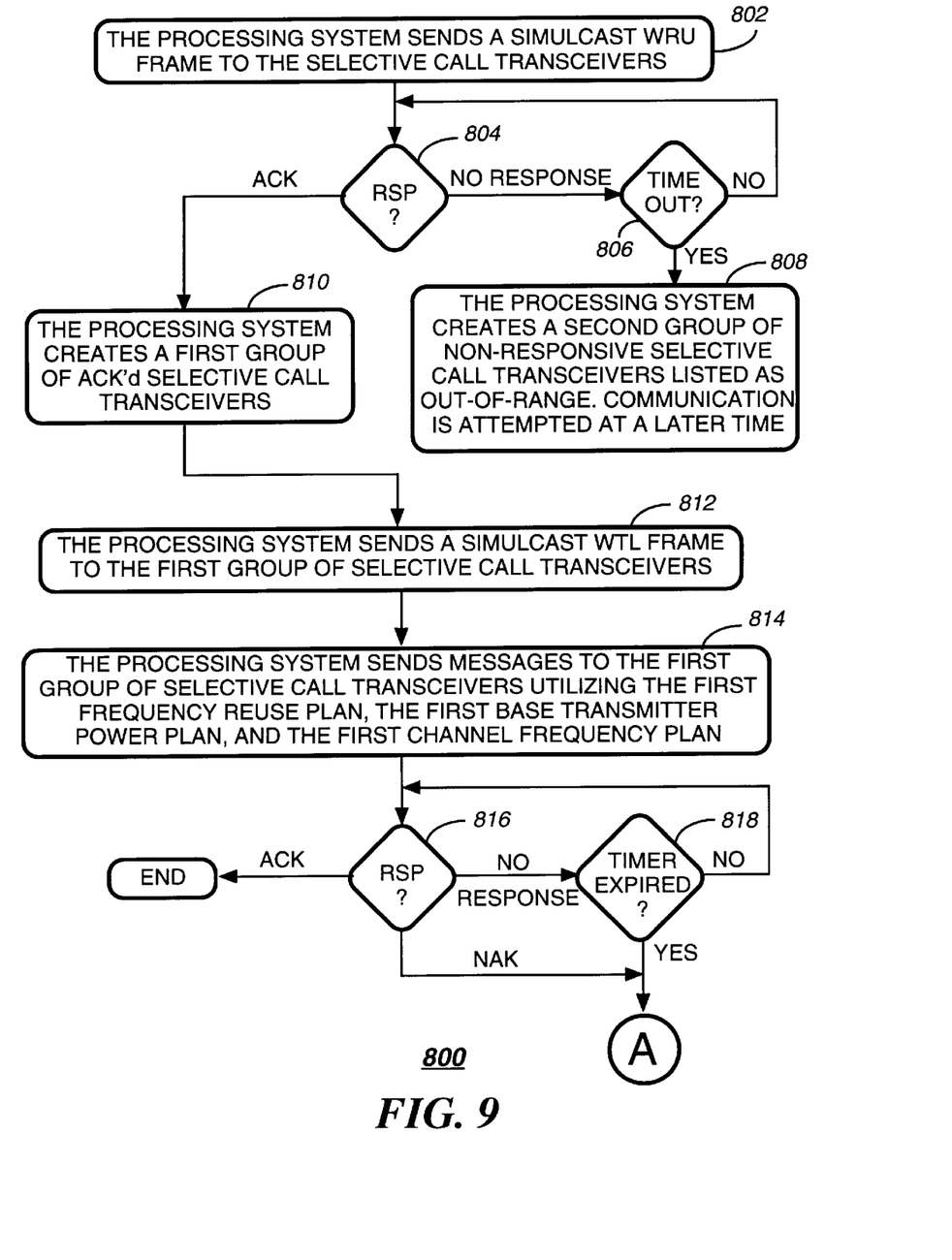
FIGS. 9 and 10 are flow charts of the controller operation according to the present invention.
Figure 10:
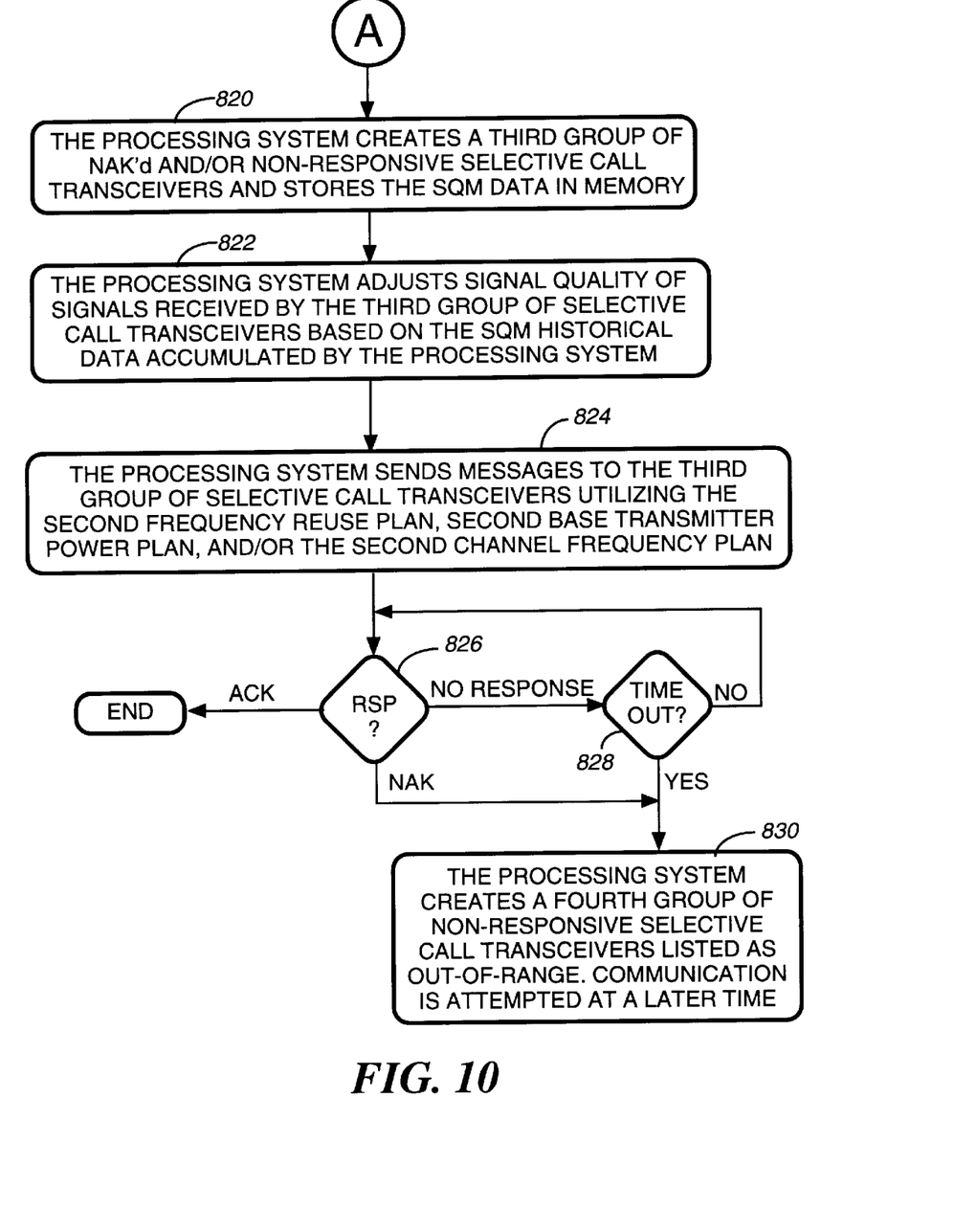

FIGS. 9 and 10 depict overall operation 800 of the controller 112 according to the present invention. The operation 800 begins with step 802 where the processing system 210 of the controller 112 sends a simulcast "Where aRe yoU (WRU)" message to the selective call transceivers 122. In step 804 the processing system 210 waits for responses from the selective call transceivers 122. If a group of response messages received are ACKs, then processing system 210 proceeds to step 810 where it creates a first group of ACK'd selective call transceivers 122. If there is a group of selective call transceivers 122 which do not respond within a predetermined time, determined in step 806, then the processing system 210 proceeds to step 808 where it creates a second group of non-responsive selective call transceivers 122 listed as out-of-range. Communication with this group is attempted at a later time.

In step 812 the processing system sends a simulcast "Where To Listen" (WTL) frame to the first group of selective call transceivers 122 specifying the point in time where the outbound message 408 will be transmitted to the selective call transceivers 122. In step 814 the processing system 210 sends the outbound messages to the first group of selective call transceivers 122 utilizing the first frequency reuse plan, the first base transmitter power plan, and the first channel frequency plan. A base power plan is the power level of the base transmitter communicating with the selective call transceiver, and/or the power levels of nearby base transmitters. A frequency reuse plan involves those base transmitters that could contribute to co-channel interference of the selective call transceiver at a current location of the selective call transceiver. For example, base transmitters B2–B7 in FIG. 4 are potential co-channel interferers (indeed first tier interferers) with respect to a selective call transceiver in communication with base transmitter B1. The first frequency reuse plan provides the highest system capacity available for communicating with the selective call transceivers 122. However, as is well known to one of ordinary skill in the art, the greater capacity derived from a frequency reuse plan results in greater levels of noise interference in the two-way communication system. The first channel frequency plan determines the channel frequency of the base transmitter in communication with the selective call transceiver 122 for receiving outbound messages transmitted by the base transmitter. A new channel frequency, if necessary to reduce the signal-to-noise interference level caused by adjacent channel interference, is transmitted to the selective call transceiver to enable it to properly tune to the new frequency.

Two prevalent noise interferences are co-channel and adjacent channel interference. Co-channel interference is caused by multiple coverage areas utilizing the same communication frequency. In two-way communication systems, coverage areas utilizing the same communication frequency are placed by design as far apart as possibly allowed by the frequency reuse plan. However, when co-channel interference remains a problem, an adjustment of the frequency reuse plan resulting in an increase in the signal-to-interference ratio helps to substantially reduce this interference.

Adjacent channel interference is caused by power that is coupled between adjacent frequency channels. By adjusting the channel frequency plan, that is, assigning a different channel frequency to the selective call transceiver 122 for receiving outbound messages, adjacent channel interference can be substantially reduced for those selective call transceivers 122 experiencing this problem. A third form of interference nearly always present in the two-way communication system is transceiver noise inherent in the selective call transceivers 122. By adjusting the base transmitter power plan, the selective call transceivers 122 receive a stronger RF signal that compensates for inherent noise in the selective call transceiver 122. It can be appreciated that adjusting the base transmitter power plan may also affect co-channel and adjacent channel interference at the selective call transceiver.

The selective call transceivers 122 are programmed to measure these three forms of interference during message transmission with the methods described above, and are further programmed to include this measurement data in the SQM data 534 field when responding on the inbound channel.

In step 816 the processing system 210 waits for responses from the selective call transceivers 122. If a group of response messages received are ACKs, then processing system 210 discontinues processing for that group of selective call transceivers 122. If there is a group of selective call transceivers 122 which do not respond within a predetermined time, determined in step 818, and/or a group of selective call transceivers 122 responding with NAKs, then the processing system 210 proceeds to step 820 of FIG. 10 where it creates a third group of NAK'd and/or non-responsive selective call transceivers 122. Note the NAK messages include SQM data 534 from the failed outbound message(s) transmitted in step 814.

In step 822 the processing system 210 adjusts signal quality of signals received by the third group of selective call transceivers 122 based on the SQM historical data accumulated by the processing system 210 from previous communication cycles. The adjustment of the signal quality of signals received by the third group of selective call transceivers 122 is based on several possible courses of action. In accordance with one course of action, the processing system 210 is programmed to adjust a power plan transmitted by the at least one base transmitter 202 in accordance with the SQM data 534 stored in the memory of the computer system 212. The power plan is the radio frequency (RF) power levels transmitted by the plurality of base transmitters 202 in the two-way communication system. The adjusted power plan results in a second power plan utilized for communicating with the third group of selective call transceivers 122.

In a second course of action, the processing system 210 is programmed to adjust a frequency reuse plan transmitted by a plurality base transmitters 202 in accordance with the SQM data 534 stored in the memory of the computer system 212. The adjusted frequency reuse plan results in a second frequency reuse plan affecting those base transmitters that are potential co-channel interferers with the selective call transceiver 122, and utilized for communicating with the third group of selective call transceivers 122. In a third course of action, the processing system 210 is programmed to adjust both the frequency reuse plan and the power plan transmitted by the plurality base transmitters 202 in accordance with the SQM data 534 stored in the memory of the computer system 212. In a fourth course of action, the processing system 210 is programmed to the adjust channel frequency plan of the selective call transceiver 122 experiencing adjacent channel interference, thereby removing the adjacent channel interference, in accordance with the SQM data 534 stored in the memory of the computer system 212. The adjusted channel frequency plan results in a second channel frequency plan utilized for communicating with the third group of selective call transceivers 122.

Step 822 includes any of the four courses of action described above, as well as others useful to achieve desired signal qualities throughout a coverage area. In step 824 the processing system 210 sends outbound messages to the third group of selective call transceivers 122 utilizing the second frequency reuse plan, the second base transmitter power plan, and/or the second channel frequency plan derived in step 822. In step 826 the processing system 210 waits for responses from the third group of selective call transceivers 122. If a group of response messages received are ACKs, then processing system 210 discontinues processing for that group of selective call transceivers 122. If there is a group of selective call transceivers 122 which do not respond within a predetermined time, determined in step 828, and/or a group of selective call transceivers 122 respond with NAKs, then the processing system 210 proceeds to step 830 where it creates a fourth group of NAK'd and/or non-responsive selective call transceivers 122 listed as out-of-range, and stores received SQM data transmitted by those selective call receivers. Communication with this group is attempted at a later time.

It will be appreciated that, alternatively, the processing system 210 can be programmed to resend a WRU message along with a WTL message to the third group of selective call transceivers 122 to account for selective call transceivers 122 that may have relocated to other coverage areas in the two-way communication system. To accomplish this, the processing system would repeat steps 802 through 812 prior to sending outbound messages in step 824 to the third group of selective call transceivers 122.

It will be further appreciated that, alternatively, the processing system 210 can be programmed to use any number of frequency reuse plans, base transmitter power plans, and/or channel frequency plans such as, for example, yet a third frequency reuse plan, a third base transmitter power plan, and/or third channel frequency plan to attempt communication with the fourth group of selective call transceivers 122. It will be further appreciated that, alternatively, the processing system 210 can be programmed to use any number of frequency reuse plans, base transmitter power plans, and/or channel frequency plans for any group of selective call transceivers 122 such as, for example, the first group of selective call transceivers 122. The selection of the frequency reuse plan, the base transmitter power plan, and/or channel frequency plan is determined by the processing system 210 in accordance with a historical database of SQM data derived from a history of transmission cycles between the selective call transceivers 122 and the base transceiver 102.

It will be further appreciated that communication transactions between the base transceiver 102 and the selective call transceivers 122 in the two-way communication system of the present invention is non-real-time. It will also be appreciated that the two-way communication system of the present invention is unlike prior art real-time systems such as cellular telephony, where the two-way cellular subscriber units conform to the cellular system environment (i.e., noise interference) rather than the cellular system conforming to the environment of the cellular subscriber units as is done by the present invention.

Figure 11:
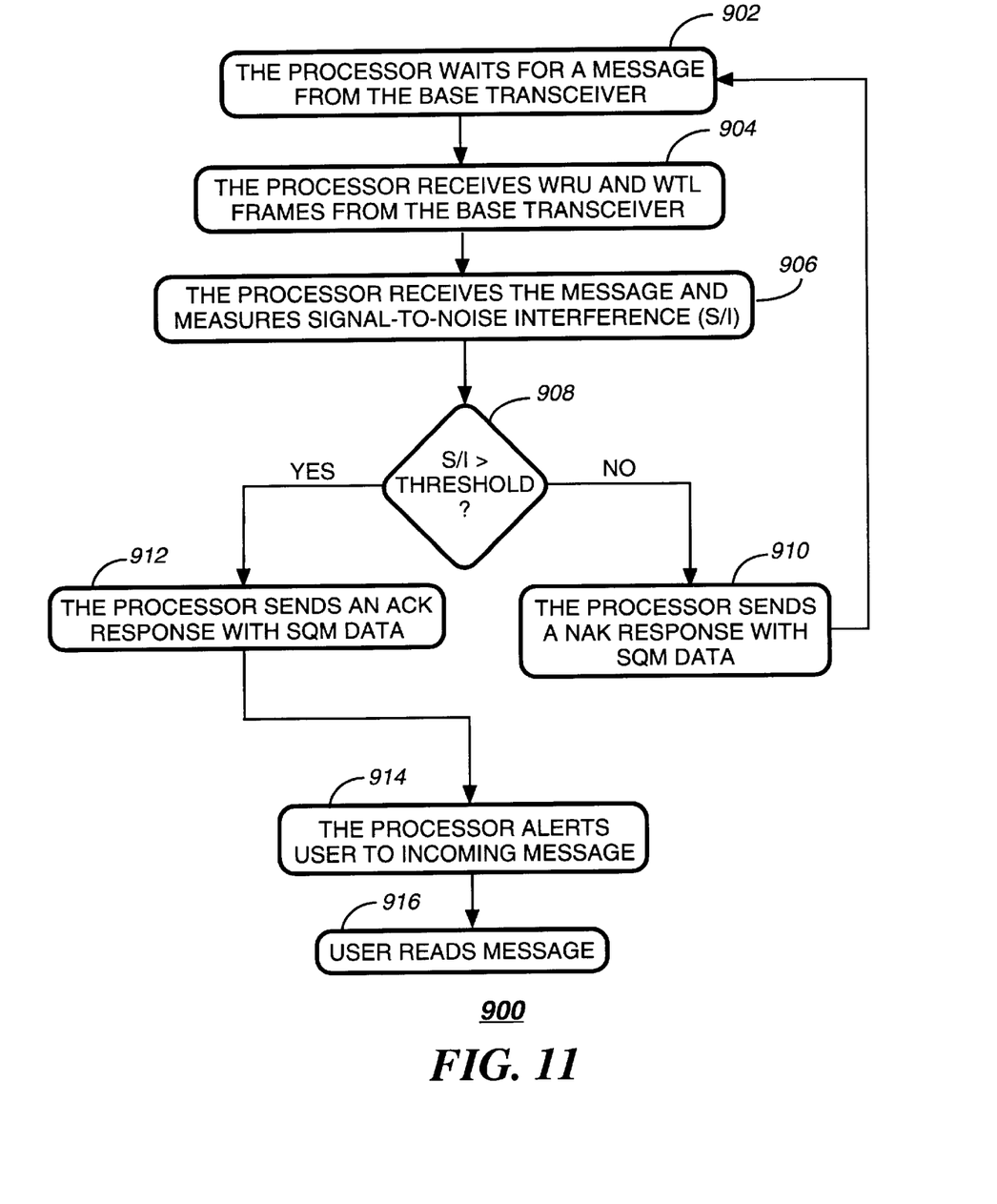
FIG. 11 is a flow chart of the selective call transceiver operation according to the present invention.

FIG. 11 is a flow chart 900 of the selective call transceiver 122 operation according to the present invention. The flow chart 900 begins with step 902 where the selective call transceiver 122 waits for a message from the base transceiver 102. In step 904 the processor receives WRU and WTL frames from the base transceiver 102. In step 906 the processor 310 of the selective call transceiver 122 measures signal quality of the signals of the outbound message received from base transceiver 102 in accordance with the methods described above.

The processor 310 is programmed for measuring several types of interference. First, the at least one selective call transceiver 122 is programmed for measuring adjacent channel interference based on the signals received from the at least one base transmitter 202, and for generating adjacent channel interference data included in the SQM data 534 to be transmitted to the base transceiver 102. Secondly, the selective call transceiver 122 is programmed for measuring co-channel interference based on the signals received from the base transmitter 202, and for generating co-channel interference data included in the SQM data 534 to be transmitted to the base transceiver 102.

The selective call transceiver 122 is still further programmed for measuring noise interference of the receiver 306 based on the signals received from the base transmitter 202, and for generating receiver noise data included in the SQM data 534 to be transmitted to the base transceiver 102. The selective call transceiver 122 is yet further programmed for measuring co-channel interference, adjacent channel interference, and receiver 306 noise interference based on the signals received from the base transmitter 202, and for generating co-channel interference data, adjacent channel interference data and receiver noise interference data included in the SQM data 534 to be transmitted to the base transceiver 102.

Once the signal-to-interference measurement is made, the processor 310 proceeds to step 908 where it determines whether the signal-to-interference measurement is greater than a predetermined threshold stored in the memory of the selective call transceiver 122. If the signal-to-interference measurement is less than the predetermined threshold, then the processor 310 proceeds to step 910 where it sends via the transmitter 304 a NAK response message 532 with the SQM data 534 to the base transceiver 102, and returns to step 902 where the processor 310 awaits for a re-transmitted outbound message. If the signal-to-interference measurement is greater than the predetermined threshold, then the processor 310 proceeds to step 912 where it sends via the transmitter 304 an ACK response message 532 together with the SQM data 534 (or alternatively without the SQM data 534) to the base transceiver 102. In step 914 the processor 310 alerts the user of the selective call transceiver 122 of the incoming message by way of the alerting device 322. In step 916 the user receives via the display or audio system the message by invoking functions provided by the user controls 320.

Thus, the present invention provides a greatly improved two-way communication system for performing noise interference measurement and control of the quality of signals transmitted by the base transceiver to be received by a selective call transceiver. In particular, the two-way communication system transmits signals that are measured by the selective call transceivers to derive a signal quality measurement. The signal quality measurement is then transmitted to the base transceiver for analysis on how to best improve signal quality of signals to be received by those selective call transceivers experiencing interference. The base transceiver can accumulate SQM data to generate a historical SQM database for dynamically reconfiguring the two-way communication system by, for example, adjusting the frequency reuse plan, the base transmitter power plan, and/or the channel frequency plan.

What is claimed is:

1. A two-way communication system comprising:
   a plurality of base transmitters for transmitting signals;
   at least one base receiver for receiving signals;
   a controller coupled to the at least one base receiver and the plurality of base transmitters for coordinating communication by the at least one base receiver and at least one base transmitter, the controller comprising a memory;
   at least one selective call transceiver comprising a transmitter, a receiver and a processor, the processor programmed for measuring signal quality of signals transmitted by the at least one base transmitter and received by the receiver of the at least one selective call transceiver and generating a signal quality measurement thereof for transmission via the transmitter of the at least one selective call transceiver to the at least one base receiver, said signal quality measurement identifying a cause and degree of signal interference; and
   wherein the at least one base receiver receives the signal quality, measurement for storage in the memory of the controller, and wherein the controller is programmed to adjust a frequency reuse plan affecting those base transmitters of the plurality of base transmitters that contribute to co-channel interference of the at least one selective call transceiver, thus the controller dynamically adjusts signal quality of signals to be received by the receiver of the at least one selective call transceiver in accordance with the signal quality measurement stored in the memory.

2. The two-way communication system of claim 1, wherein the controller is programmed to adjust a power plan transmitted by at least one of the plurality of base transmitters in accordance with the signal quality measurement stored in the memory.

3. A base transceiver comprising:
   at least one base transmitter for transmitting signals;
   at least one base receiver for receiving signals;
   a controller coupled to the at least one base receiver and a plurality of base transmitters including the at least one base transmitter for coordinating communication by the at least one base receiver and the at least one base transmitter, the controller comprising a memory; and
   wherein the at least one base receiver receives a signal quality measurement from at least one selective call transceiver for storage in the memory of the controller, said signal quality measurement identifying a cause and degree of signal interference, and wherein the controller is programmed to adjust a frequency reuse plan affecting those base transmitters of the plurality of base transmitters that contribute to co-channel interference of the at least one selective call transceiver, thus dynamically adjusting signal quality of signals to be received by the at least one selective call transceiver in accordance with the signal quality measurement stored in the memory.

4. The base transceiver of claim 3, wherein the controller is programmed to adjust a power plan transmitted by at least one of the plurality of base transmitters in accordance with the signal quality measurement stored in the memory.

* * * * *